United States Patent Office 2,945,766
Patented July 19, 1960

2,945,766

METHOD OF FERMENTING MEAT PRODUCTS AND COMPOSITION THEREFOR

Louis Chaiet, Newark, N.J., assignor to Merck & Co., Inc., Rahway, N.J., a corporation of New Jersey No Drawing. Filed Apr. 29, 1957, Ser. No. 655,525

3 Claims. (Cl. 99—107)

This invention relates to sausage manufacture and particularly to a composition and process for improving the fermentation action for the purpose of accentuating a desirable flavor in the sausage.

In the processing of sausages it has been a common practice to add certain microorganisms which bring about a characteristic desirable flavor. Generally speaking, these microorganisms form lactic acid which contributes to the desired flavor of the sausage, but it is known that other products are elaborated by the growth of the microorganisms and that these products contribute to the flavor of the sausage. In this respect this starter culture corresponds to the starter cultures of different microorganisms which are used in the dairy industry for the production of buttermilk, sour cream and the various cheeses.

The starter cultures which are used in the meat industry are produced as a result of fermentation of the selected microorganism in a nutrient culture medium. After the growth of the selected microorganism has resulted in an enormous growth of the cells, the cells are harvested and isolated principally by centrifugation, the centrifugate being discarded. The resulting mass of cells may be added directly to the sausage to initiate new growth for the production of the desired flavor characteristics in the sausage. For ease of handling, the collected cells are sometimes subjected to a freeze-drying process and it is this dried product which is sent to the place of use.

The living microorganisms are added to the sausage and the sausage is processed in the temperature range (80–110° F.) which favors the growth of the culture, and it is during the continued growth of the cells in the sausage that the substances which they elaborate impart the desirable flavor to the sausage. One measure of the extent of the growth is the resulting lowering of the pH of the sausage. An increase in the acidity of the sausage means not only that an increased amount of lactic acid has been formed, but that an increased amount of the other elaboration products which are essential to the development of the desired flavor has also resulted.

One of the advantages in the use of a starter culture rather than chance inocculation is that with a given substrate and in a given time, a given amount of starter culture will produce the desired flavor or tang. Longer fermentation times and/or larger amounts of starter usually produce more tang as measured by a higher acidity. Of course, this is only true if there are enough nutrients in the substrate to carry on reproduction of the organism. For instance, if 1 mg. of starter culture cells were added to 100 grams of ground meat pH 5.9 in a sausage beaker test (hereinafter described), at the end of 20 hours at 37° C. the pH may be pH 5.2. If five times the amount of starter were added, the pH may drop to about pH 5.05 in 20 hrs.

In accordance with the present invention it has been found that the addition of manganese salts to the starter culture, either before or after the starter culture has been added to the meat mixture, results in a marked stimulation in the action of the culture starter, i.e., (1) a marked decrease of culture starter necessary to produce a given acidity or (2) a marked increase of acidity per unit weight of culture starter. This increased acidity is indicated both by the lowering of the pH of the sausage and by the imparting of an improved and accentuated flavor to the sausage.

In carrying out the invention it is possible to utilize any salt which results in the release of manganese ions. This can be achieved readily with the use of the more common manganese salts such as manganese chloride, manganese sulfate and manganese phosphate, but manganese salts of other inorganic acids may be used as well. It is also possible to utilize manganese salts of organic acids, such as manganese acetate, or manganese benzoate. In addition, the invention contemplates the use of manganese salt complexes, such as chelates, the important consideration being that the selected salt be one which allows manganese ions to be available to the cells.

Addition to the culture starter of other inorganic salts, such as iron, magnesium, potassium and sodium, as well as sources of carbon, nitrogen and accessory nutrients such as dextrose, trypton and yeast extract did not result in a stimulation of acid production.

Although the isolated culture starter cells contain small amounts of manganese (i.e. 0.3–0.4% of the dry cell weight), it has been found that the optimum results are obtained if the salt is added in such an amount so that it is present as manganese ion in a concentration of about .4% of the microorganism cells by weight. Increased concentrations of manganese ion beyond .4% have been observed to either not increase the production of acid further or may result in a somewhat lower acidity in the sausage. On the other hand, if the concentration of the salt, expressed as the manganese ion, is less than 0.5% of the cell weight it has been found that the pH is not lowered to the desired point, nor is the flavor accentuated to the desired extent.

In carrying out the invention the culture starter cells may be fortified with manganese salts in the wet state prior to drying or the cells may be dry blended with the manganese salt. It is also apparent that the same results can be achieved by adding the manganese salt directly to the sausage independently of the addition of the culture starter, it being only necessary that the manganese is in intimate contact with the cells and that the two ingredients be added at about the same time to obtain maximum stimulation of acidity.

The manganese salts are preferably used in conjunction with a culture of *Pediococcus cerevisiae* which is one of the commonly used sausage culture starters. This microorganism has been stated by Pederson in Bacteriol. Review 13, 225–232, to be the same species as *Pediococcus damnosus*, *Pediococcus perniciosus*, *Pediococcus sarcinaeformis*, *Pediococcus tetragenus*, *Pediococcus acidi lactici*, *Streptococcus damnosus*, *Streptococcus damnosus* var. *viscosus* and *Streptococcus damnosus* var. *pentoasceus*.

The invention may also be used with other microorganisms which are used to impart distinctive flavors to sausage, such as *Streptococcus lactis* and the group consisting of the Lactobacilli such as are identified in Patent No. 2,225,783, which issued on December 24, 1940, and is entitled "Sausage Treatment."

Mention may here be made of the fact that although the invention has particular application to fermented sausage, such as cervelat, summer sausage, salami and thuringer, pork roll, Lebanon bologna, the invention may be carried out as well with other beef and pork products to which a fermentation starter culture is added.

The product of the invention does not require any departure from the usual manner in which the meat products are fermented with the starter culture. Ordinarily, an amount not to exceed ¼ of 1% of the starter culture is intimately mixed with the ground meat, although it is apparent that lesser amounts may be added, depending upon the taste which is to be obtained. No departure from such conventional practice is required in adding the manganese salt of the invention.

A method of test in the laboratory for sausage culture starters is the beaker sausage test. This is a use test in which the starter is added to ground lean beef (pretreated with sodium chloride, glucose and sodium nitrite) in a beaker and the mixture allowed to incubate at 37° C. for 20 hours. The amount of acidity produced in the meat (i.e. pH) is an indication of the activity of the starter culture.

Example I

A nutrient culture medium in which the growth of *Pediococcus cerevisiae* is carried on is centrifuged and the filtrate is discarded. One gram of the wet cell cake was slurried in forty mls. of water. The slurry was further diluted 1:10 with the following solutions: (1) water, (2) an aqueous solution of manganese chloride containing 40 p.p.m. of manganese, (3) an aqueous solution of ferrous sulfate containing 8 p.p.m. of iron, (4) an aqueous solution of magnesium sulfate containing 80 p.p.m. of magnesium. One ml. of each of the final diluted solutions were added to separate 100 gram portions of ground meat in the sausage-beaker test and incubated at 37° C. for 20 hours. The pH's of the incubated meat are shown below:

|  | pH |
| --- | --- |
| Control (no cells added) | 5.85 |
| Water | 5.18 |
| Manganese solutions (40 p.p.m.) | 5.10 |
| Iron solution (8 p.p.m.) | 5.30 |
| Magnesium solution (80 p.p.m.) | 5.22 |

Example II

A nutrient culture medium in which the growth of *Pediococcus cerevisiae* is carried on is centrifuged and the filtrate is discarded. The Pediococcus cells were dried and were assayed by the sausage beaker test as is and fortified with manganese (as manganese chloride) to the extent of 4% of the cell weight. The results of the test are shown below:

| Mg. cells/100 gms. meat | Manganese Fortification, percent | Sausage pH |
| --- | --- | --- |
| 0 | 0 | 5.77 |
| 0.5 | 0 | 5.35 |
| 1.0 | 0 | 5.30 |
| 0.5 | 4 | 5.10 |
| 1.0 | 4 | 5.02 |

Example III

A nutrient culture medium in which the growth of *Pediococcus cerevisiae* is carried on is centrifuged and the filtrate is discarded. To the solid material containing the cells was added varying amounts of manganese (as manganese chloride) and the cells subjected to the sausage-beaker test. The results are indicated below:

| Mg. cells per 100 gms. meat | Added Manganese, Percent Wt. of cells | Sausage pH |
| --- | --- | --- |
| 0 | (control) | 5.75 |
| 1.5 | 0 | 5.50 |
| 7.5 | 0 | 5.35 |
| 1.5 | 12 | 5.35 |
| 1.5 | 4 | 5.25 |
| 1.5 | 1.3 | 5.35 |

Example IV

A nutrient culture medium in which the growth of *Pediococcus cerevisiae* is carried on is centrifuged and the filtrate is discarded. To the solid material containing the cells was added varying amounts of manganese (as manganese chloride) and the cells subjected to the sausage beaker test. The results are shown below:

| Mg. cells per 100 gms. meat | Added manganese, Percent Cell weight | Sausage pH |
| --- | --- | --- |
| 0 (control) | | 5.90 |
| 1 mg | 0 | 5.48 |
| 2.5 mg | 0 | 5.45 |
| 5.0 | 0 | 5.40 |
| 1 mg | 12 | 5.35 |
| 1 mg | 4 | 5.35 |
| 1 mg | 1.3 | 5.45 |

In Examples I, II, III and IV the mixture of the manganese salt and the cells was added in the amount of 1 to 1.5 mg. of the mixture to 100 grams of the sausage mix. Other examples in which a higher concentration, as well as a lower concentration, of the manganese salt and the cellular mixture is added to the sausage mix, are obvious.

Example V

The process of Example I is carried out but manganese sulfate is substituted for the manganese chloride and it is added so that a 4% concentration of manganese ion results.

The manganese sulfate may be added to the cellular mixture as set forth in Examples II, III and IV, and in varying amounts of addition to the sausage mix.

Example VI

Additional examples of the invention will be apparent, including the substitution of other manganese salts such as manganese hydrogen phosphate, manganese acetate, manganese benzoate, for the manganese chloride or manganese sulfate of the above example.

Example VII

The nutrient culture medium in which the growth of *Pediococcus cerevisiae* is carried on is centrifuged and the filtrate is discarded. The solid material containing the cells is subjected to freeze-drying and to the dried cells is then added manganese chloride so that the manganese ions constitute 4% by weight of the mixture. One milligram portion of this dried cell is addded to 100 grams of sausage mix. The desired increase in acidity was obtained.

Example VIII

The nutrient culture medium in which the growth of of *Pediococcus cerevisiae* is carried on is centrifuged and the filtrate is discarded. To the solid material containing the cells is added manganese chloride so that the manganese ions constitute 4% by weight of the mixture and it is then subjected to freeze-drying. One milligram portion of this dried cell is added to 100 grams of sausage mix. The desired increase in acidity was obtained.

Example IX

The nutrient culture medium in which the growth of *Pediococcus cerevisiae* is carried on is centrifuged and the filtrate is discarded. The cellular mass is collected and a 1.0 mg. dried culture is added to 100 grams of sausage mix, together with manganese chloride in an amount such that the manganese ion constitutes 4% by weight of the cellular mass. The desired increase in acidity was obtained.

From the above examples and disclosure it is evident that the invention broadly involves the addition of at least 3 mg. of manganese per 100 lbs. of meat in conjunction with the fermentation culture. It is the presence of this additional amount of manganese to the meat and in the presence of the fermentation producing microorganism that brings about the desirable increased elaboration of the important metabolic material. Although these microorganisms will in nearly all instances be added to the meat as a starter culture, in some instances the microorganism is added to the fresh sausage by adding thereto a small amount of sausage which has already undergone fermentation and which therefore includes a sufficient amount of the microorganism to initiate fermentation in the fresh sausage meat.

What is claimed is:

1. The method of fermenting meat products which involves adding a bacterial fermentative culture to the meat up to ¼% of the meat, together with a manganese salt, the manganese being present in the amount of at least 0.5% of the weight of the culture but less than 4% and adding heat to keep at a temperature of 80°–110° F. until the desired taste is obtained.

2. The method of fermenting meat products at a temperature of 80°–110° F. which invloves adding at least 3 mg. of manganese per 100 pounds of meat in conjunction with a bacterial fermentation culture, the culture being present up to ¼% of the meat.

3. A composition for addition to meat products to carry on fermentation which consists of a bacterial fermentative microbiological culture in an amount up to ¼% of the weight of the meat, and a manganese salt, the manganese salt being present in an amount greater than 0.5% by weight of the microbiological culture but less than 4%.

References Cited in the file of this patent

UNITED STATES PATENTS 2,225,783   Jensen _____ Dec. 24, 1940

OTHER REFERENCES

"Bacterial Chemistry and Physiology," 1946, by J. R. Porter, published by John Wiley & Sons, Inc., New York, pages 618 to 627 inclusive.